US012719906B2

(12) United States Patent
Salla et al.

(10) Patent No.: US 12,719,906 B2
(45) Date of Patent: Aug. 25, 2026

(54) SYSTEMS AND METHODS FOR AUTOMATED CYBER SECURITY AND CONTROL MONITORING

(71) Applicant: JPMORGAN CHASE BANK, N.A., New York, NY (US)

(72) Inventors: Pradeep Kumar Salla, New York, NY (US); Sreenivas Bodapati, New York, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 510 days.

(21) Appl. No.: 17/370,758

(22) Filed: Jul. 8, 2021

(65) Prior Publication Data

US 2022/0014545 A1 Jan. 13, 2022

Related U.S. Application Data

(60) Provisional application No. 63/049,972, filed on Jul. 9, 2020.

(51) Int. Cl.
*H04L 9/40* (2022.01)
*H04L 67/133* (2022.01)

(52) U.S. Cl.
CPC ........ *H04L 63/1433* (2013.01); *H04L 63/166* (2013.01); *H04L 67/133* (2022.05)

(58) Field of Classification Search
CPC . H04L 63/1433; H04L 63/10; H04L 63/0263; H04L 63/0254; H04L 67/12; H04L 67/125; H04L 67/34; H04L 67/60
See application file for complete search history.

(56) References Cited

U.S. PATENT DOCUMENTS

| | | | | |
|---|---|---|---|---|
| 9,648,040 | B1 * | 5/2017 | Morkel | G06F 21/629 |
| 10,073,694 | B2 * | 9/2018 | Jamjoom | G06F 9/44526 |
| 10,452,454 | B1 * | 10/2019 | Beard | G06F 9/54 |
| 11,641,343 | B2 * | 5/2023 | Subbarayan | H04L 45/74 726/12 |
| 2016/0321167 | A1 * | 11/2016 | Shah | H04W 4/50 |
| 2018/0124197 | A1 * | 5/2018 | Srivastava | H04L 67/10 |
| 2019/0020665 | A1 * | 1/2019 | Surcouf | H04L 67/10 |
| 2019/0213326 | A1 * | 7/2019 | Dykes | G06F 21/552 |
| 2019/0243964 | A1 * | 8/2019 | Shukla | G06F 21/54 |
| 2019/0312860 | A1 * | 10/2019 | Dykes | H04L 63/10 |
| 2019/0318100 | A1 * | 10/2019 | Bhatia | G06F 21/554 |

(Continued)

*Primary Examiner* — Tae K Kim
(74) *Attorney, Agent, or Firm* — GREENBERG TRAURIG LLP

(57) ABSTRACT

Systems and methods for automated cyber security and control monitoring are disclosed. In one embodiment, a method for automated cyber security and control monitoring may include: (1) receiving, by a cyber audit tool computer program executed by a computer processor, Application Programmable Interface (API) standards from a source; (2) identifying, by the cyber audit tool computer program, a plurality of expected API controls for the API standards; (3) receiving, by the cyber audit tool computer program, API runtime control data for an API; and (4) generating, by the cyber audit tool computer program, a report identifying expected API controls present in the API runtime control data, expected controls missing from the API runtime control data, and unexpected controls in the API runtime control data.

18 Claims, 2 Drawing Sheets

(56) References Cited

U.S. PATENT DOCUMENTS

| | | | | |
|---|---|---|---|---|
| 2020/0012785 | A1* | 1/2020 | Dykes | G06F 21/552 |
| 2020/0125342 | A1* | 4/2020 | Dominiak | G06N 20/00 |
| 2020/0233787 | A1* | 7/2020 | Battaglia | H04L 63/0876 |
| 2020/0233790 | A1* | 7/2020 | Battaglia | H04L 67/02 |
| 2020/0265145 | A1* | 8/2020 | Slabyak | G06F 8/70 |
| 2020/0358823 | A1* | 11/2020 | McCarty | H04L 63/20 |
| 2020/0364078 | A1* | 11/2020 | Potter | G06F 21/53 |
| 2020/0366697 | A1* | 11/2020 | Vittal | H04L 41/22 |
| 2020/0410125 | A1* | 12/2020 | Norman | H04L 63/10 |
| 2021/0099478 | A1* | 4/2021 | Seetharamaiah | H04L 63/14 |
| 2021/0112088 | A1* | 4/2021 | Ramasamy | H04L 63/1433 |
| 2021/0314342 | A1* | 10/2021 | Oberg | H04L 63/20 |
| 2021/0344774 | A1* | 11/2021 | Ge | H04L 67/60 |

* cited by examiner

SYSTEMS AND METHODS FOR AUTOMATED CYBER SECURITY AND CONTROL MONITORING

RELATED APPLICATIONS

This application claims priority to, and the benefit of, U.S. Provisional Patent Application Ser. No. 63/049,972 filed Jul. 9, 2020, the disclosure of which is hereby incorporated by reference in its entirety.

BACKGROUND OF THE INVENTION

1. Field of the Invention

Embodiments are generated directed to systems and methods for automated cyber security and control monitoring.

2. Description of the Related Art

Open Web Application Security Project (OWASP) is an online industry community that publishes key controls for Restful API. The National Institute of Technology Standards (NIST) also publishes guidance on this. Technology teams must enforce these industry standard security best practices to protect an organization's API's, API endpoints, and API data from malicious actors.

For each technology team or an individual developer to learn/know the standards and best practices is one challenge; even if one can learn all the standards, implementing those consistently across an organization is another challenge. If implemented, validating and ensuring there is no future regression is a third challenge.

SUMMARY OF THE INVENTION

Systems and methods for automated cyber security and control monitoring are disclosed. According to one embodiment, a method for automated cyber security and control monitoring may include: (1) receiving, by a cyber audit tool computer program executed by a computer processor, Application Programmable Interface (API) standards from a source; (2) identifying, by the cyber audit tool computer program, a plurality of expected API controls for the API standards; (3) receiving, by the cyber audit tool computer program, API runtime control data for an API; and (4) generating, by the cyber audit tool computer program, a report identifying expected API controls present in the API runtime control data, expected controls missing from the API runtime control data, and unexpected controls in the API runtime control data.

In one embodiment, the API standards may include industry API standards. The source may include the Open Web Application Security Project (OWASP) or the National Institute of Technology Standards (NIST).

In one embodiment, the source may include an organizational source and the API standards may include organizational API standards.

In one embodiment, the method may further include receiving, by the cyber audit tool computer program, a selection of a subset of the API standards, wherein the expected controls are identified for the subset of API standards.

In one embodiment, the subset of API standards may be automatically selected based on a type of API.

In one embodiment, the cyber audit tool computer program may identify the expected API controls from a mapper logic file.

In one embodiment, the step of receiving API runtime control data may include scanning, by the cyber audit tool computer program, the API for the API runtime control data. The API runtime control data may be exposed by the API.

In one embodiment, the report may include a risk for each missing expected API control.

In one embodiment, the method may further include modifying, by the cyber audit tool computer program, the API to include the missing expected API control. In one embodiment, the cyber audit tool computer program may modify the API by implementing a script or code to the API.

According to another embodiment, an electronic device may include a memory storing a cyber audit tool computer program and a computer processor. When executed by the computer processor, the cyber audit tool computer program may cause the computer program to: receive Application Programmable Interface (API) standards from a source; identify a plurality of expected API controls for the API standards; receive API runtime control data for an API; and generate a report identifying expected API controls present in the API runtime control data, expected controls missing from the API runtime control data, and unexpected controls in the API runtime control data.

In one embodiment, the API standards may include industry API standards, and wherein the source may include the Open Web Application Security Project (OWASP) or the National Institute of Technology Standards (NIST).

In one embodiment, the source may include an organizational source and the API standards may include organizational API standards.

In one embodiment, the cyber audit tool computer program may further cause the computer processor to receive a selection of a subset of the API standards, wherein the expected controls are identified for the subset of API standards.

In one embodiment, the subset of API standards may be automatically selected based on a type of API.

In one embodiment, the cyber audit tool computer program may cause the computer processor to receive API runtime control data by scanning the API for the API runtime control data. The API runtime control data may be exposed by the API.

In one embodiment, the cyber audit tool computer program may further cause the computer processor to modify the API to include the missing expected API control.

BRIEF DESCRIPTION OF THE DRAWINGS

In order to facilitate a fuller understanding of the present invention, reference is now made to the attached drawings. The drawings should not be construed as limiting the present invention but are intended only to illustrate different aspects and embodiments.

DETAILED DESCRIPTION OF PREFERRED EMBODIMENTS

Embodiments are directed to systems and methods for automated cyber security and control monitoring.

In embodiments, a scanning tool may be used to evaluate API configurations across multiple API management products to extract controls and policies. The tool may be provided with selected standards (e.g., OWASP standards, NIST standards, etc.) and may then compare the compared the enforced controls and policies at runtime with the items the selected standards for the APIs opened to external and internal application, and may generate a report on compliance with the selected standards.

In one embodiment, the tool may be written in any suitable programming language, such as Java and Python.

In one embodiment, the report may be in restful JSON format.

Figure 1:
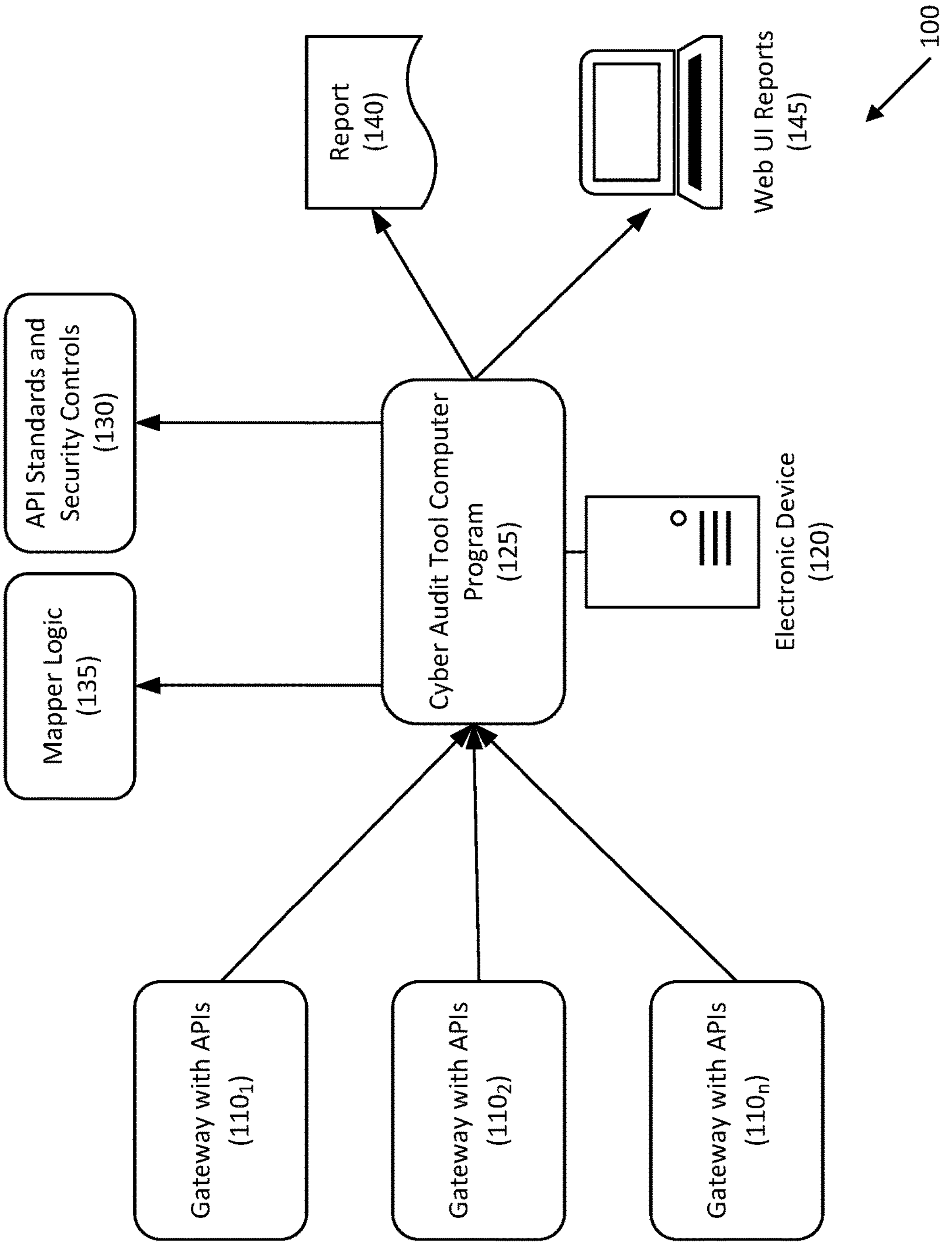
FIG. 1 is a depicts a system for automated cyber security and control monitoring according to an embodiment.

Referring to FIG. 1, a system for automated cyber security and control monitoring is disclosed according to one embodiment. System 100 may include gateways $\mathbf{110}_1$, $\mathbf{110}_2$, . . . $\mathbf{110}_n$ that may include one or more API. Examples of gateways 110 include Google Apigee Edge gateway, IBM API connect, IBM datapower, etc.

In one embodiment, one or more of the APIs may be real-time APIs.

Gateways 110 may provide API data, for example, zip artifacts, Restful APIs, ZIP artifacts and SOAP, etc.

For example, each gateway 110 may receive input in a different format.

Gateways 110 may interface with cyber audit tool computer program 125, which may include one or more computer programs or application executed by one or more electronic device 120, such as cyber audit tool computer program 125. Examples of electronic device 120 include servers (e.g., physical servers, cloud based-servers, combinations, etc.), computers (e.g., workstations, desktop computers, notebook computers, laptop computers, tablet computers, smart devices, Internet of Things appliances, etc.

Cyber audit tool computer program 125 may interface with one or more source 130 for API standards, security controls, etc. Examples of sources 130 include OWASP and NIST. Any other suitable source may be included as is necessary and/or desired.

Cyber audit tool computer program 125 may include different and independent tools that may implement a wide variety of policies or actions. For example, OWASP standards with regard to distributed denial of service (DDoS) attacks and protecting the backend systems from spike bursts may be enforced with different policies and actions, such as a service level monitoring (SLM) action in IBM DataPower, rate limiting in IBM API Connect, and Spike arrest/Quota in Google's Apigee products in the Services, API Gateways and API proxies respectively.

In one embodiment, sources 130 may further include organizational API standards, security controls, policies, etc.

In one embodiment, mapper logic 135 may map the policies and actions to traffic limits and DDoS protection policies of OWASP/NIST standard. Likewise, xml threat protection, SQL injections, JSON threat protections and hundreds of policies and actions may be translated on the fly to OWASP/NIST standards.

In one embodiment, mapper logic 135 may be a file, and may map a policy or action to one or more expected API controls.

In one embodiment, each of the gateways 110 with APIs may have its own implementation and respective policies, such as actions based on vendor product, internally developed actions, etc. Embodiments may map the actions/policies like DDOS, SQl threat protection, AuthN/AuthZ, rate-limiting/spike arrests, etc. to OWASP. Examples of tools that may be considered include Google's Apigee, IBM API Connect, and IBM SOA DataPower appliances.

Cyber audit tool computer program 125 may receive API data from gateways 110 and may apply some or all of the API standards and security controls to the API data. For example, only certain API standards and security controls may be relevant to an organization, and those may be selected to be applied. For example, a user may select the API standards and security controls to apply using a user interface.

For example, cyber audit tool computer program 125 may scan and evaluate API configurations across multiple API management products. It may extract the controls and policies, and may be provided with OWASP and NIST standards that are important to the organization. Cyber audit tool computer program 125 may compare the enforced controls and policies at runtime with the items important to the enterprise for the APIs opened to external and internal applications and may generate a report.

Cyber audit tool computer program 125 may further identity controls that are not being implemented, as well as unknown or unexpected controls.

Cyber audit tool computer program 125 may generate an output, including reports 140, web user interface reports 145, etc. The reports may be in any suitable format (e.g., JSON), may be available via a web interface, etc.

In one embodiment, a tool operator (not shown) may produce the report manually; in another embodiment, as API may be used by an authorized user to provide new or updated standards or policies, and to generate reports.

In one embodiment, the report may be provided as a table that identifies each standard as implemented or not implemented for each API across multiple API management platforms. In one embodiment, the report may be presented graphically, and the report may be generated on an ad hoc basis using, for example, a self-service user interface (not shown).

In embodiments, reports may be presented as a large table that identifies each standard if it is implemented or not for each API across multiple API management platforms. In embodiments, the report may be presented graphically, with visualization and/or ad hoc view generation at the user interface.

Embodiments may provide enterprise-grade access controls.

Embodiments may provide the ability to track standards versions and generation and analysis across multiple versions of standards.

Embodiments may further provide the ability to track standard versions, and the generation and analysis across multiple versions of standards.

Figure 2:
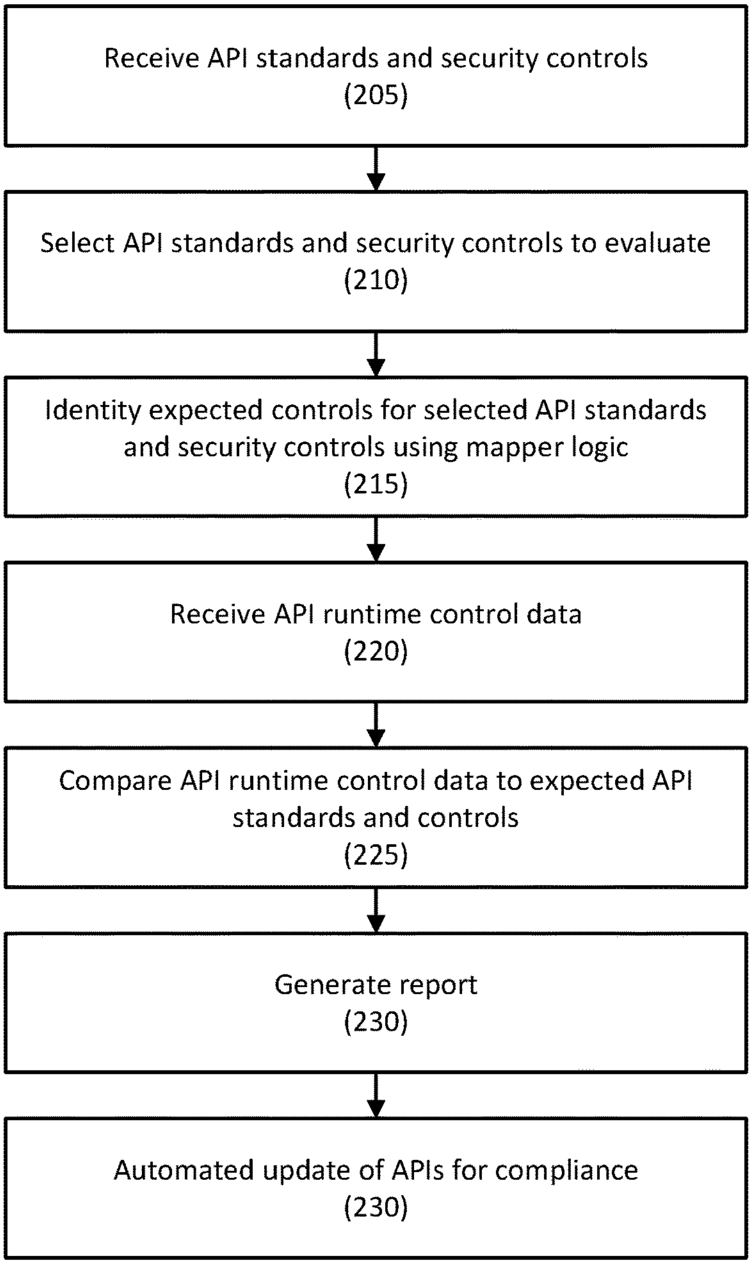
FIG. 2 depicts a method for automated cyber security and control monitoring according to an embodiment.

Referring to FIG. 2, a method for automated cyber security and control monitoring is disclosed according to one embodiment. In one embodiment, the method may provide an automated view of how APIs enforce certain OWASP and NIST standards for APIs across multiple platforms. Embodiments may validate OWASP controls and secures APIs at runtime, protecting an enterprise by identifying gaps with best practices and industry security standards on managed API platforms.

In step 205, a cyber audit tool computer program may receive API standards and security controls from one or more source. Example sources include OWASP, NIST, organizational sources, etc.

In one embodiment, the API standards may be industry standards, organizational policies, etc.

In step 210, the cyber audit tool computer program may select, or may receive a selection of, API standards and security controls to evaluate. For example, a user may select some or all of the API standards and security controls received in step 205 using, for example, a user interface. In another embodiment, machine learning may be used to identify the API standards and security controls to evaluate. For example, a certain type of API may automatically have certain API standards and security controls that are relevant to it selected.

In step 215, the cyber audit tool computer program may identify expected controls for the API. For example, using the mapper logic, the cyber audit tool computer program identity the expected controls for the selected API standards and security controls.

In step 220, the cyber audit tool computer program may receive API runtime control data from, for example, one or more gateways. In one embodiment, the cyber audit tool computer program may scan the APIs to identity the API standards and controls applied by the APIs.

For example, the runtime data may be exposed, and APIs may make restful API calls and generate the reports applying the mapping logic. If a given platform does not have an API, artifacts may be extracted in ZIP files programmatically using, for example, Python. The data (yaml, xml and other formats) may be extracted.

In step 225, the cyber audit tool computer program may compare the API runtime control data to the expected API standards and controls. The cyber audit tool computer program may identify expected controls that are present in the API runtime control data, expected controls that are absent from the API runtime control data, and unexpected controls in the API runtime control data.

In step 230, the cyber audit tool computer program may generate one or more compliance reports. For example, compliance reports may be in any suitable format (e.g., JSON), may be made available via a web interface, etc. The compliance reports may specify the expected controls that are present in the API runtime control data, the expected controls that are not present in the API runtime control data, and the unexpected controls in the API runtime control data. In one embodiment, the cyber audit tool computer program may further identity the industry and/or organizational policy associated with the missing expected controls, and may provide a risk associated with the missing expected controls.

In one embodiment, the cyber audit tool computer program may categorize the controls and give the controls a score. The score may be associated with an indicator such as a color (e.g., red-amber-green), a letter grade (e.g., A, B, C, . . . F), pass/fail, high-medium-low risk, etc. Any suitable indicator may be used as is necessary and/or desired.

In one embodiment, the indicator may be provided independently of the score. For example, if an API is missing a control, the API may be marked as red, fail, high risk, etc. regardless of the score.

In one embodiment, the cyber audit tool computer program may review the unexpected controls and, based on user feedback, may update the expected controls in the mapping logic to include the unexpected controls. In one embodiment, the unexpected controls may be associated with an industry and/or organizational policy.

In one embodiment, the cyber audit tool computer program periodically update the controls and may include feedback based on implemented controls. For example, internal teams may review and update the controls and provide new control mappings for unexpected controls for implementation as is necessary and/or desired.

In step 230, the cyber audit tool computer program, or another program, may update any noncompliant API to include the missing expected controls. For example, the cyber audit tool computer program, or another program, may insert code or script for the missing expected control into the API, or may otherwise revise the API to include the code or script. In another embodiment, the cyber audit tool computer program, or another program, may provide the noncompliant API with a link to the code or script to implement the missing expected control. Any suitable manner of updating the noncompliant APIs may be used as is necessary and/or desired.

In one embodiment, a template may be provided for providing information necessary to implement the missing expected control.

Hereinafter, general aspects of implementation of the systems and methods of the invention will be described.

The system of the invention or portions of the system of the invention may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for automated cyber security and control monitoring, comprising:

receiving, by a cyber audit tool computer program executed by a computer processor, Application Programmable Interface (API) standards from a source, wherein the standards comprise National Institute of Technology Standards (NIST) standards;

identifying, by the cyber audit tool computer program, a plurality of expected API controls to implement the API standards;

receiving, by the cyber audit tool computer program at API runtime, API runtime control data for an API, wherein the API runtime control data identifies actual API controls used by the API at API runtime; and generating, by the cyber audit tool computer program and from the API runtime control data, a report identifying a first subset of the expected API controls that are present in the API runtime control data, a second subset of the expected controls that are not present in the API runtime control data, and API controls in the API runtime control data that are not expected API controls.

2. The method of claim 1, wherein the API standards comprise industry API standards.

3. The method of claim 1, wherein the source comprises an organizational source and the API standards comprise organizational API standards.

4. The method of claim 1, further comprising:

receiving, by the cyber audit tool computer program, a selection of a subset of the API standards, wherein the expected controls are identified for the subset of API standards.

5. The method of claim 4, wherein the subset of API standards is automatically selected based on a type of API.

6. The method of claim 1, wherein the cyber audit tool computer program identifies the expected API controls from a mapper logic file.

7. The method of claim 1, wherein the step of receiving API runtime control data comprises scanning, by the cyber audit tool computer program, the API for the API runtime control data.

8. The method of claim 7, wherein the API runtime control data is exposed by the API.

9. The method of claim 1, wherein the report comprises a risk for each missing expected API control.

10. The method of claim 1, further comprising:

modifying, by the cyber audit tool computer program, the API to include the second subset of expected API controls.

11. The method of claim 10, wherein the cyber audit tool computer program modifies the API by implementing a script or code to the API.

12. An electronic device, comprising:

a memory storing a cyber audit tool computer program; and a computer processor;

wherein, when executed by the computer processor, the cyber audit tool computer program causes the computer processor to:

receive Application Programmable Interface (API) standards from a source, wherein the standards comprise National Institute of Technology Standards (NIST) standards;

identify a plurality of expected API controls to implement the API standards;

receive API runtime control data for an API at API runtime, wherein the API runtime control data identifies actual API controls used by the API at API runtime; and generate from the API runtime control data, a report identifying a first subset of the expected API controls that are present in the API runtime control data, a second subset of the expected controls that are not present in the API runtime control data, and API controls in the API runtime control data that are not expected API controls.

13. The electronic device of claim 12, wherein the source comprises an organizational source and the API standards comprise organizational API standards.

14. The electronic device of claim 12, wherein the cyber audit tool computer program further causes the computer processor to receive a selection of a subset of the API standards, wherein the expected controls are identified for the subset of API standards.

15. The electronic device of claim 14, wherein the subset of API standards is automatically selected based on a type of API.

16. The electronic device of claim 12, wherein the cyber audit tool computer program causes the computer processor to receive API runtime control data by scanning the API for the API runtime control data.

17. The electronic device of claim 16, wherein the API runtime control data is exposed by the API.

18. The electronic device of claim 12, wherein the cyber audit tool computer program further causes the computer processor to modify the API to include the second subset of expected API controls.

* * * * *